United States Patent
Albers et al.

(10) Patent No.: US 8,101,784 B2
(45) Date of Patent: Jan. 24, 2012

(54) PROCESS FOR REMOVING VOLATILE COMPONENTS FROM A SUBSTANCE MIXTURE AND APPARATUS FOR PERFORMING THIS PROCESS

(75) Inventors: Michael Albers, Darmstadt (DE); Stefan Schardt, Münster (DE)

(73) Assignee: UIC GmbH, Alzenau-Horstein (DE)

( * ) Notice: Subject to any disclaimer, the term of this patent is extended or adjusted under 35 U.S.C. 154(b) by 641 days.

(21) Appl. No.: 12/225,266

(22) PCT Filed: Mar. 13, 2007

(86) PCT No.: PCT/EP2007/002174
§ 371 (c)(1),
(2), (4) Date: Sep. 17, 2008

(87) PCT Pub. No.: WO2007/107260
PCT Pub. Date: Sep. 27, 2007

(65) Prior Publication Data
US 2009/0118524 A1    May 7, 2009

(30) Foreign Application Priority Data
Mar. 19, 2006    (DE) .......................... 10 2006 012 866

(51) Int. Cl.
*C11B 1/00* (2006.01)

(52) U.S. Cl. ............ 554/8; 554/175; 202/185.2; 203/42
(58) Field of Classification Search .............. 554/8, 175; 202/185.2; 203/42
See application file for complete search history.

(56) References Cited

U.S. PATENT DOCUMENTS

| | | | |
|---|---|---|---|
| 2,126,467 A | | 8/1938 | Hickman et al. |
| 5,211,812 A | * | 5/1993 | Vielberth et al. ............. 202/172 |
| 2004/0210070 A1 | * | 10/2004 | Kruidenberg ................. 554/205 |
| 2004/1021007 | | 10/2004 | Kriudenberg ................. 554/205 |

FOREIGN PATENT DOCUMENTS

| | | |
|---|---|---|
| DE | 40 08 066 A1 | 8/1991 |
| DE | 100 24 420 A1 | 11/2001 |
| EP | 0 189 610 A | 8/1986 |
| EP | 189610 * | 8/1986 |
| WO | WO 01/03810 A2 | 1/2001 |
| WO | WO 0103810 * | 1/2001 |
| WO | WO 2004/007654 A1 | 1/2004 |
| WO | WO 2004/007655 A1 | 1/2004 |

* cited by examiner

*Primary Examiner* — Deborah D Carr
(74) *Attorney, Agent, or Firm* — Fay Sharpe LLP

(57) ABSTRACT

A process and an apparatus separate a volatile component from a substance mixture (raw product). The substance mixture is heated, the volatile component is at least partly evaporated and then the vapor formed is condensed. To improve the separating action, the condensate, in the region of the point of condensation, is contacted with a liquid in which the condensate dissolves.

23 Claims, 5 Drawing Sheets

PROCESS FOR REMOVING VOLATILE COMPONENTS FROM A SUBSTANCE MIXTURE AND APPARATUS FOR PERFORMING THIS PROCESS

BACKGROUND

The invention relates to a process for separating one or several volatile component(s) from a substance mixture, in which the substance mixture is heated, the volatile component(s) is/are at least partially evaporated and the then formed vapor is condensed. In addition, the invention relates to a device suitable for performing said process.

The pre-requisites for distillation processes of the mentioned type are that the component(s) to be separated has/have a lower boiling point than the other component(s) of the substance mixture and that with respect to the component(s) to be separated, a vapor pressure gradient is maintained between the location of the evaporation and the location of the condensation.

The term "flash distillation" generally means a vacuum distillation technique in which evaporator and condenser are arranged in one and the same vessel in such manner that the vapor molecules travel a short path from the location of the evaporation to the location of the condensation. Normally, the distance between evaporator and condenser surface in industrial flash distillation apparatuses amounts from a few centimeters up to several decimeters. If the distance between evaporator surface and condenser surface is smaller than the average free path length of the vapor molecules, one talks of molecular distillation.

Based on low operating pressures, flash distillation and molecular distillation are, among others, excellent methods for distillative separation of one or several volatile components from bi- or multi-substance mixtures with low operating temperatures. The method, however, always reaches its limitation if the vapor pressure of the distilled component or components on the condensation surface reaches the partial pressure of the corresponding component(s) in the mixture on the heated evaporator wall. Further separation of the volatile component(s) is then no longer possible, since, according to the understanding of flash distillation, the driving force, i.e. the pressure difference, is lacking, or according to the understanding of molecular distillation, the evaporation rate at the evaporator surface corresponds to the evaporation rate of the respective component(s) on the interior condenser. Further lowering of the interior condenser temperature in order to reduce the vapor pressure of the volatile component(s) over the condensate flow on the interior condenser is frequently not possible, because the condensate would solidify, for example.

SUMMARY

It is the object of the present invention to improve a distillation method.

The condensate, according to the meaning of the invention, is brought into contact with a liquid, in which it dissolves. Thus, concentration and vapor pressure of the component to be condensed, are lowered in the area of the place of condensation. The vapor pressure gradient between the place of evaporation and the place of condensation is hereby increased, thereby achieving an improvement in the degree of separation.

It is of particular benefit to perform the invention-specific method under conditions of flash- or molecular distillation and/or to employ for the execution of the invention-specific method a flash distillation- or molecular distillation apparatus, which is equipped with means for supply and outward transfer of that particular liquid which serves to dissolve the condensate. Inasmuch as said liquid has the effect of lowering the concentration of the volatile component by diluting the condensate, it is hereinafter also called washing fluid.

It does not matter with respect to the invention-specific process whether the evaporation takes place from a mechanically wiped film or from an un-wiped film flowing steady or turbulent on the heated evaporator surface. It likewise does not matter whether the evaporation takes place as with the classical flash evaporator, from a heated evaporator surface surrounding the condenser, onto a washing fluid trickling film, or vice-versa, from an evaporator surface arranged inside the apparatus to a trickling film flowing down the interior wall of the apparatus. In principle, all configurations of evaporator surfaces and condenser surfaces are possible, in which, for example, the boundary conditions of flash distillation or molecular distillation are maintained.

The washing fluid must, on the one hand, have the property of dissolving the volatile component to be separated. Additionally, the washing fluid must have a sufficiently low vapor pressure. In the event that the washing fluid is a substance mixture and/or a volatile substance mixture that is to be separated, all components of the respective substance mixtures must have the mentioned properties.

In a beneficial embodiment of the invention-specific process, a trickling film is generated with the aid of the washing fluid, which flows and is maintained on the surface of a cooled condenser. An externally cooled condenser can be done away with if the washing fluid itself is adequately cooled in such fashion that its surface forms the condensation surface. In case of the latter, it is possible to even do without a surface on which the washing fluid flows down. It suffices, for example, if the washing fluid flows in form of droplets in the vicinity of the evaporator surfaces.

If an installation is used, on which the washing fluid trickles down, then it is appropriate to provide its surface with unevenness, which causes swirling of the washing fluid. It is also possible to preferably employ a wire mesh as installation.

The substance or the substance mixture applied for producing the trickling film can be transferred outward from the apparatus by means of a single pass-through or also by means of circulating the volatile component(s) until attaining the desired enrichment.

BRIEF DESCRIPTION OF THE DRAWINGS

Additional benefits and details of the invention are going to be explained using exemplary embodiments, represented schematically in FIGS. 1 to 9.

DETAILED DESCRIPTION

Figure 1:
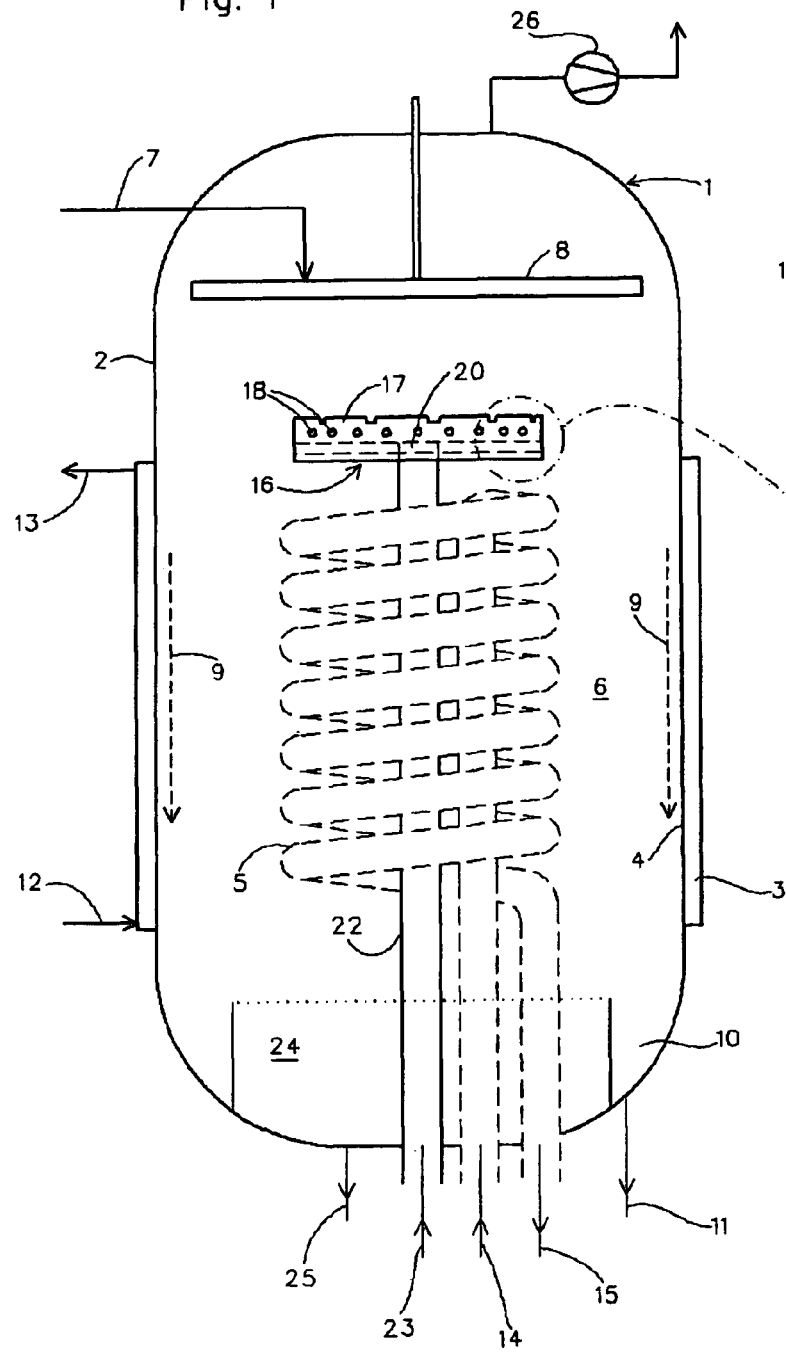

In the apparatus 1 according to FIG. 1, the vessel is identified with 2, the thermal casing with 3, the evaporator surface with 4 and the condenser with 5. The condenser 5 is shown in dotted lines. This is to indicate that in the event that the washing fluid is self-cooled, the condenser need not be present. We will deal more specifically with this variation below. The evaporator chamber is identified with 6, and, as customary, designed essentially cylindrically.

Addition of the raw product takes place via line 7, on a plate 8, arranged in the upper region of vessel 2, mostly operating in rotating fashion, whose task it is to conduct the raw product to the walls of vessel 2 and/or the evaporator surface 4 in such manner that is flows down on the evaporator surface as trickling film 9. The liquid film 9 leaving the evaporator surface 4 collects in the outer channel 10 and is transported out via line 11. Supply and removal of thermal medium to/from thermal casing 3 takes place via lines 12 and 13.

The condenser 5, designed as pipe coil, is cooled internally. Charge and discharge of cooling agent/thermal carrier takes place via lines 14 or 15.

Figure 2:
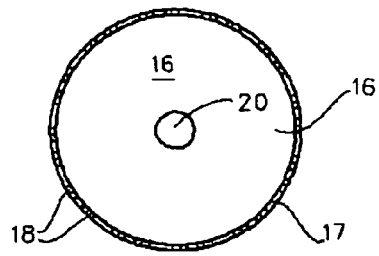
FIGS. 1 to 3 depict a distillation apparatus according to the invention.
Figure 3:
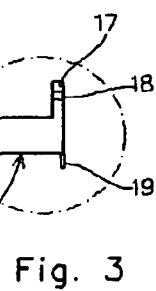

Above condenser 5 is located another plate 16, which is equipped with a weir 17 (see also FIGS. 2 and 3). Weir 17 is located above the pipe coil 5 and is equipped with pass-through apertures 18 as well as a downwardly oriented edge 19 facing the upper pipe coil.

Supply of washing fluid to condenser 5 takes place via plate 16. In the center of plate 16 there is an opening 20 into which issues an ascending pipe 22. This is supplied with washing fluid from below via connection line 23. The interior wall of the annular chamber 10 forms a centrally located chamber 24 in which collects the washing fluid which flows from condenser 5 in downward direction and is transferred out via line 25. An evacuation device connected to vessel 2 is represented only schematically and identified with 26.

During operation, the low-boilers evaporate from the evaporator surface 4. The vapor flows in direction of the condenser 5. The washing fluid reaches plate 16 via ascending line 22 and flows through the apertures 18 to the outside and downward. Washing fluid flowing along the drip edge 19 wets the surface of the condenser 5. There, the washing fluid dissolves the condensates of the low-boiling substance, which get into chamber 24, together with the washing fluid and are discharged via line 25. The dissolution and discharge of the condensate of the low-boiling substances with the washing fluid has the result—as indicated above—of lowering the vapor pressure of the low-boiler in the region of the condensation surface and thus the desired increase of vapor pressure gradient from the evaporator surface 4 to the condenser 5.

With one (or several) valve(s) it is possible to effect an exchange of washing fluid in continuous or intermittent fashion. If desired, the washing fluid can be prepared in a subsequent process and used again. It is also conceivable to segregate from the supply of the substance to be processed, a portion, either continuously or intermittently, and to employ same as washing fluid.

According to the meaning of the invention, other embodiments of distribution plate 16 and weir 17 are also conceivable, for example with curved areas or structured surfaces, metal transport units for fluid control, fluid discharges etc. Likewise, the washing fluid can be applied to the condenser area by a differently designed fluid supply- or injection system.

Figure 5:
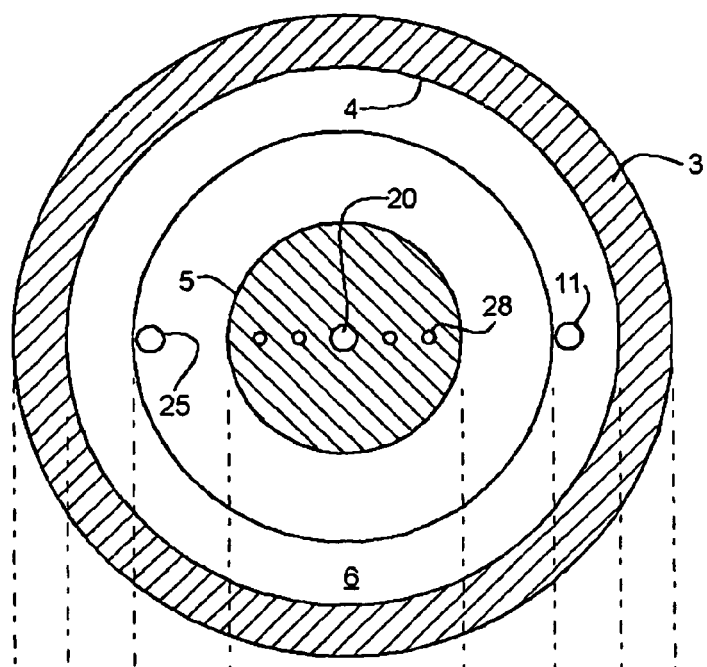
FIGS. 4 and 5 depict an exemplary embodiment according to the invention, in which tempering of condensation surface takes place by means of a heating-/cooling medium, which is independent of the employed washing fluid.
Figure 4:
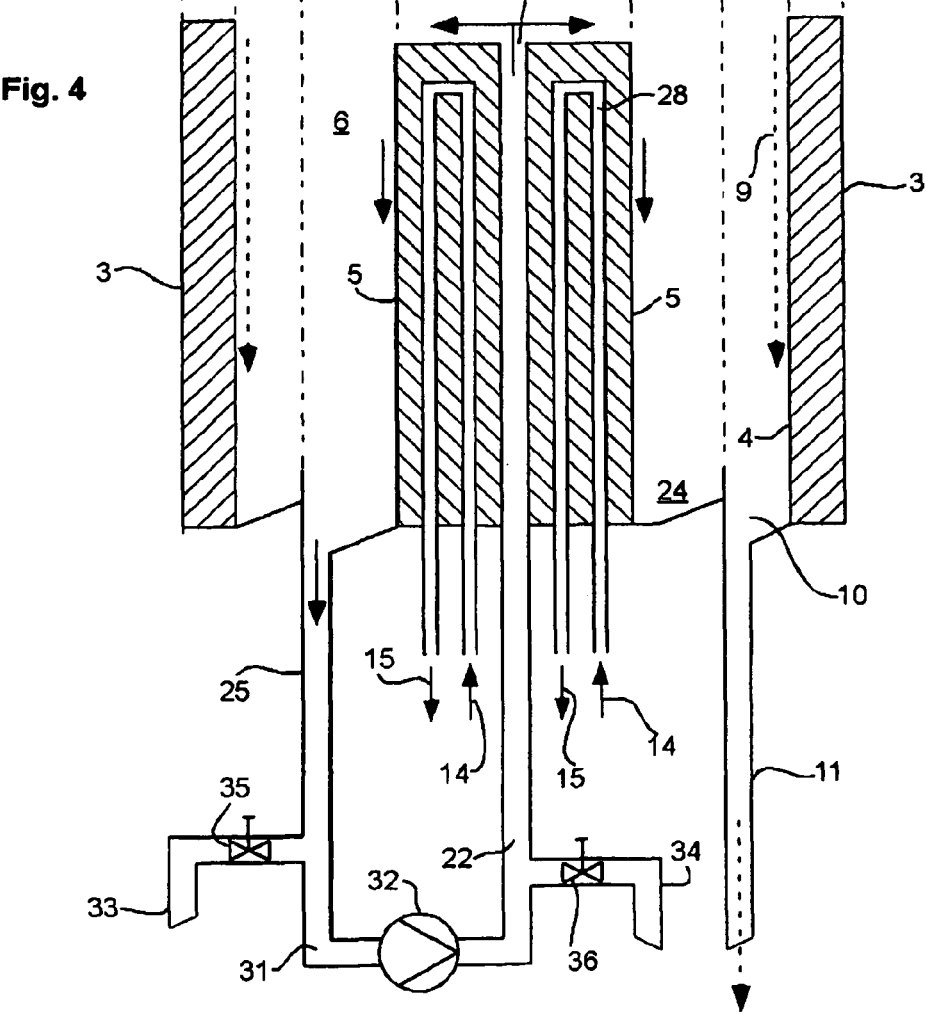

FIGS. 4 and 5 indicate schematically another embodiment of a distillation apparatus according to the invention, in which the condenser 5 cools the washing fluid. The raw product is introduced above the thermal casing 3 and flows as film 9 down-ward on the evaporator surface 4. The raw product film can flow freely as drop film or be wiped mechanically. Low-boiling components evaporate and flow on the surface of condenser 5. Non-evaporated residue remaining in film 9 gets into the collection chamber 10 and leaves the vessel via line 11.

The condenser is schematically represented as a unit with an integrated heat exchange device 28. The supply of this device with cooling fluid takes place from below (lines 14, 15).

The washing fluid exits from aperture 20 on the upper side of the condenser 5. It is already cooled while flowing through the ascending line 22. Condensation and dissolution of the low-boilers evaporated on the evaporator surface 4 takes place in the free flowing or also wiped washing fluid film, which flows down on the surface of the condenser 5. The washing fluid gets into the collection chamber 24 and leaves the vessel via line 25.

In the exemplary embodiment represented in FIG. 4, the washing fluid is circulated. A conveyor pump 32 is located in line segment 31, which connects the exit line 25 with the inlet line 22. Exchange of washing fluid, either in continuous or intermittent fashion can take place via branch lines 33 and 34 having one valve each, 35, 36. In the above described exemplary embodiments, the condenser 5 takes on the required cooling of the washing fluid. If the washing fluid itself is supplied at a sufficiently low temperature, supply of the condenser 5 with cooling fluid can be eliminated. Its surface, together with the washing fluid serves as condensation area. Finally, both, the condenser 5 and the washing fluid can also be cooled.

Figure 7:
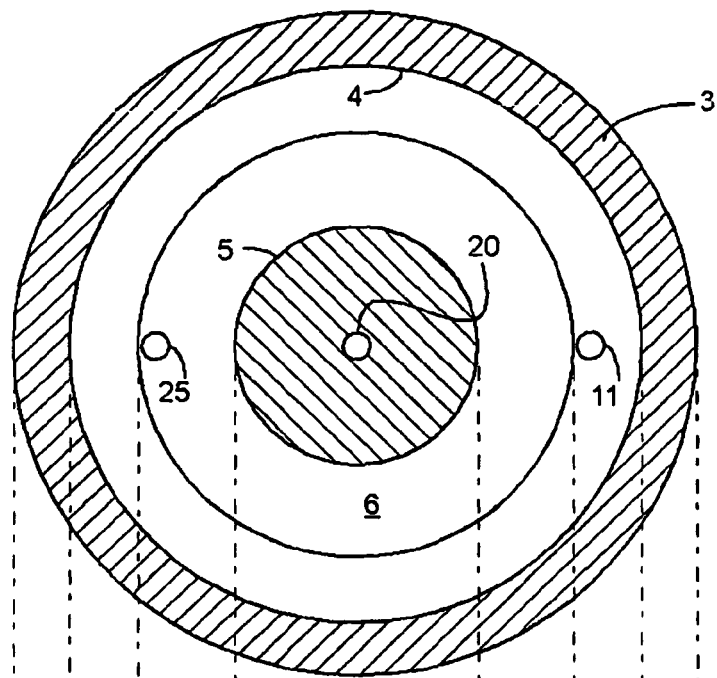
FIGS. 6, 7 depict an exemplary embodiment in which the tempering of the condensation surface is done by the washing fluid itself.
Figure 6:
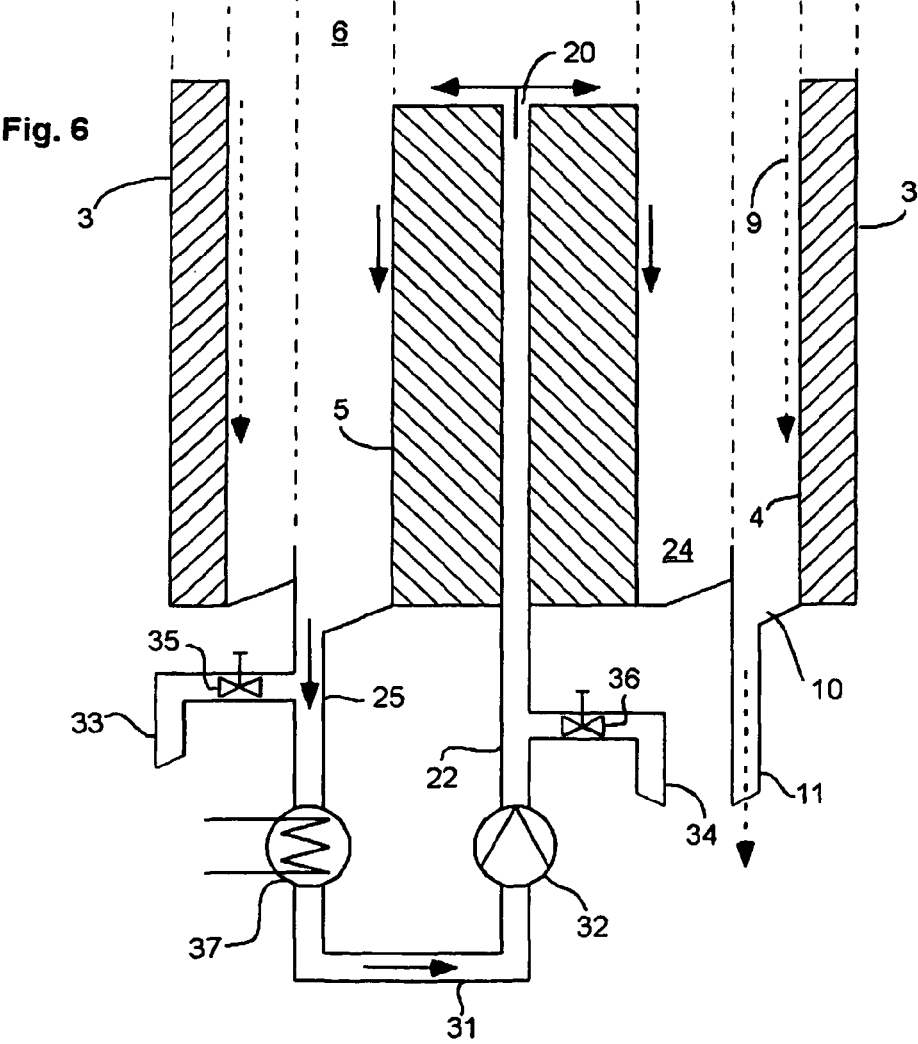
Figure 8:
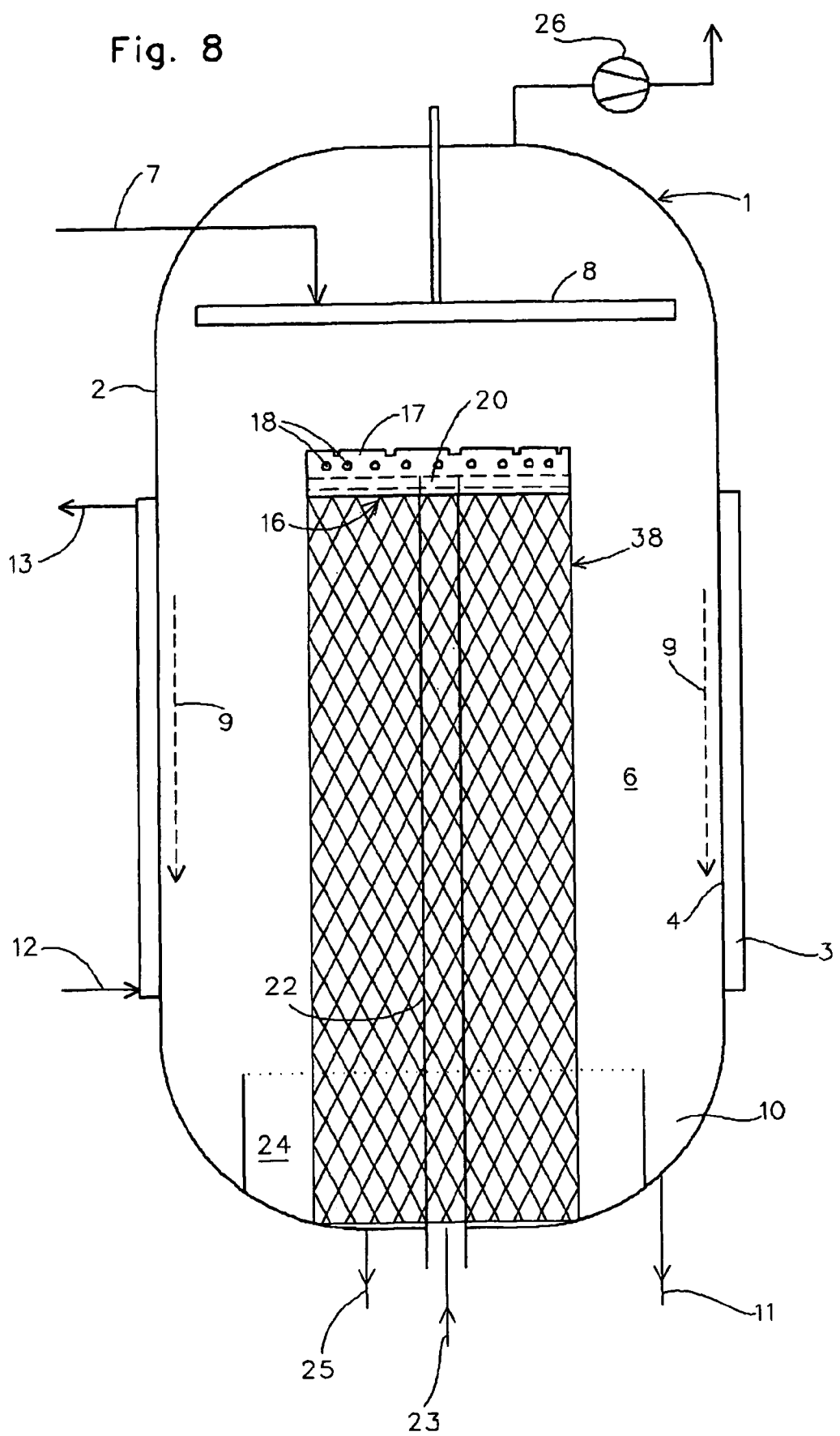
FIG. 8 depicts an exemplary embodiment in which the cooled washing fluid is carried along a wire mesh.

FIGS. 6 to 8 depict exemplary embodiments according to the invention where the washing fluid serves at the same time as cooling medium for the condensation process and as solvent for the condensing low-boilers.

The exemplary embodiment according to FIGS. 6 and 7 corresponds to FIGS. 4 and 5. The condenser unit 5 in this embodiment is not cooled. In the line segment 31, which connects the exit line 25 of the washing fluid with the inlet line 22, a heat exchanger is located in addition to pump 32. Pump 32 and heat exchanger 37 are appropriately regulated so that the washing fluid continuously enters the evaporator chamber 6 at 20 via line 22 at a sufficiently low temperature. Condensation of the low-boilers takes place in the film of the washing fluid which flows down on the surface of the condenser unit 5.

In a particularly beneficial embodiment, a solid condenser unit 5 can be totally eliminated. The self-cooled washing fluid can be supplied, for example, in the described manner and trickle down freely from a plate 16, as it is described relative to FIG. 1. Spraying of the washing fluid into the evaporator chamber is also possible.

The example according to FIG. 8, which corresponds to the embodiment according to FIG. 1, depicts a variation without condenser. Plate 16 connects in downward direction, at the height of the evaporator surface 4, with a built-in unit 38, which turbulently carries the washing fluid trickle-down film and which consists, for example, of an essentially cylindrically designed wire mesh arrangement. The built-in unit 38 extends as far as the lower collection chamber 24.

The invention is not limited to the disclosed apparatus examples. The described process can be performed in almost all appropriately designed distillation fixtures. These may be made of metal, glass and/or other materials.

General Process Examples are:

Distilling of fatty acids from vegetable or animal oils; terpenes, steroids and alkaloids from vegetable and animal natural products; pesticides, herbicides or fungicides, as well as their decomposition products from vegetable and animal oils and fat; included are processes as disclosed in the International Applications WO 2004/007 654 A1 and WO 2004/007 655 A1. Separation of color- and aroma substances, vitamins, (co)-enzymes, tetra-pyrroles, polyphenols or fatty acid esters from vegetable and animal natural products; separation of monomers from di-, tri- and polymers; of monoesters from di-, tri- and polyesters; generally monomeric or dimeric coupling components from polymers or pre-polymers, which can be produced by addition or condensation.

Figure 9:
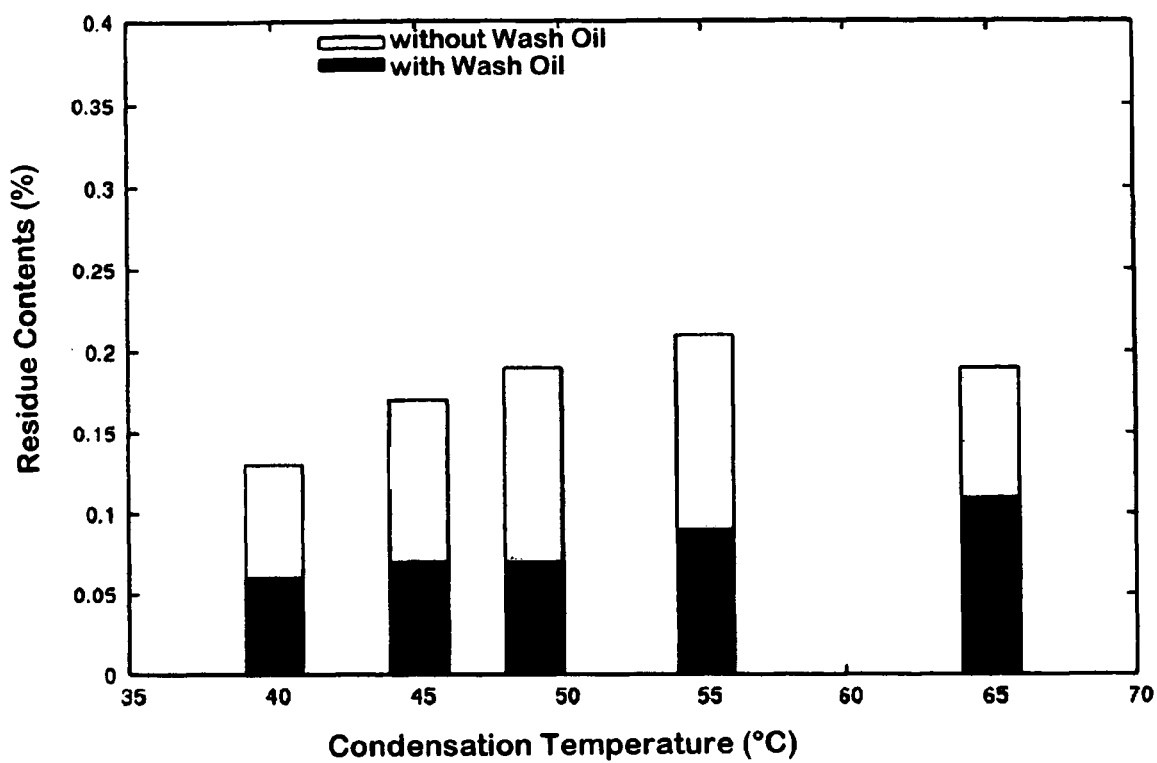
FIG. 9 depicts the results of distillation processes relative to the separation of caprylic acid from sun flower oil.

As further example, a description is provided for separation by distillation of caprylic acid from a triglyceride mixture (sun flower oil). Starter product is a 0.5% solution of caprylic acid in sun flower oil. The named mixture is exemplary for a frequently encountered separation task in an industrial application of flash distillation, namely: as much reduction as possible of the remaining concentration of low-boilers from a high-boiling substrate. During such process, it is frequently not possible, for different reasons, to select the temperature of the interior condenser optionally low, which leads to the initially described reduced depletion performance of the evaporator. Utilization of the invention-specific washing condenser results, under these conditions, to a significant improvement in the stripping performance, i.e. lowering of attainable remaining contents of low-boilers in the distillation residue. For determining the experimental data, a washing condenser was employed of the design according to FIG. 1, which can be used as both, conventional interior condenser (no washing fluid feed) as well as washing condenser with controllable washing fluid flow. Sun flower oil was employed as washing fluid. It has been shown in distillation experiments with varying condenser temperatures and other constantly kept parameters, that in the examined temperature range, the invention-specific sprinkling of the condenser with washing fluid produces a lowering of the residue contents by up to 60% in comparison with ordinary condensation. The volume flow as well as the loading of the circulated washing fluid with condensed low-boilers can vary over a larger range without having a negative impact on the depletion. FIG. 9 shows exemplary results of test distillations. The Figure indicates the residue contents (y-axis) at different condensation temperatures (x-axis).

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A process for purifying a substance mixture raw product by separating a volatile component from the substance mixture raw product under conditions of flash or molecular distillation, the processing comprising:
   heating the substance mixture such that the volatile component at least partially evaporates;
   bringing the evaporated volatile component to be separated into contact in a condensation region with a washing liquid different from the evaporated volatile component;
   condensing the evaporated volatile component on the washing liquid, under temperature and vacuum conditions that suppress evaporation of the washing liquid;
   dissolving the volatile component in the washing liquid such that a concentration of the volatile component in the raw product is reduced; and
   at least one of:
      the raw product includes vegetable or animal oils and the volatile component includes one or more of fatty acids, terpenes, steroids, alkaloids, pesticides, herbicides, fungicides, color and aroma substances, vitamins, co-enzymes, tetra pyrroles, polyphenols, or fatty acid esters; or
      the raw product includes at least one of di-, tri- and polymers, di-, tri-, and polyesters, or other polymers or pre-polymers and the volatile component includes at least one of monomers, monoesters, or mono- or dimeric coupling components.

2. The process according to claim 1, wherein a trickling film of the washing liquid is generated on a surface of a condenser.

3. The process according to claim 1, further including:
   cooling the washing liquid sufficiently low that a surface of the washing liquid functions as a condenser.

4. The process according to claim 3, further including:
   trickling the washing liquid down freely as a stream, independent of any structure.

5. The process according to claim 3, further including:
   cooling the washing liquid;
   trickling the cooled washing liquid over a passive, not cooled structure, for example, a wire mesh.

6. The process according to claim 1, further including:
   exchanging the washing liquid continuously or intermittently.

7. The process according to claim 1, further including:
   processing the washing liquid in a subsequent procedure; and
   reusing the processed washing liquid.

8. A process for separating a volatile component from a supplied substance mixture raw product under conditions of flash or molecular distillation, the processing comprising:
   heating the substance mixture raw product such that the volatile component at least partially evaporates;
   bringing the evaporated volatile component to be separated into contact in a condensation region with a washing liquid in which the volatile component dissolves such that a lowering of a concentration of the volatile component in the raw product is achieved by condensing the volatile component,
   wherein the washing liquid includes the raw product.

9. The process according to claim 8, wherein a portion of the supplied raw product is branched off continuously or intermittently, and used as the washing liquid.

10. The process according to claim 1, further including:
    regulating a relative volume and temperature of the washing liquid.

11. The process according to claim 10, wherein the washing liquid is supplied intermittently.

12. A distillation apparatus for purifying a substance mixture raw product by performing a process to separate a volatile component from a supplied substance mixture raw-product under conditions of flash or molecular distillation, in which the substance mixture raw product is heated, the volatile component is at least partially evaporated, the generated vapor is condensed, and in which the volatile component is condensed by contact with a washing liquid, the apparatus comprising:
    an evaporator surface;
    a condensation surface formed by a surface of the washing liquid, the washing liquid having a property of dissolving the volatile component such that a concentration of the volatile component in the raw product is reduced by the condensation of the evaporated volatile component on the condensation surface;
    a raw product supply system which supplies a portion of the raw product to flow over the evaporation surface to evaporate the volatile component;

a washing liquid supply system which supplies the washing liquid which forms the condensing surface which condenses the volatile component; and a purified raw product outlet which discharges the portion of the raw product after the portion of the raw product has flowed over the evaporator surface and the volatile component has been evaporated.

13. The distillation apparatus according to claim 12, further including:

a cooled condenser structure over which the washing liquid flows, the condenser structure cooling the flowing washing liquid.

14. The distillation apparatus according to claim 12, further including:

a cooler located in a supply line that supplies the washing liquid.

15. The distillation apparatus according to claim 12, further including:

a plate arranged above the evaporation surface to receive and distribute the washing liquid.

16. The distillation apparatus according to claim 15, further including:

a cooled condenser located below the plate.

17. The distillation apparatus according to claim 15, wherein a space below the plate is free from structures for guiding the washing liquid.

18. The distillation apparatus according to claim 15, further including:

a wire mesh installation disposed below the plate, the washing liquid flowing along the mesh to define the condensation surface.

19. The process according to claim 1, wherein the raw product includes vegetable or animal oils, the process including:

heating the vegetable or animal oils to evaporate volatile components including one or more of: fatty acids, terpenes, steroids, alkaloids, pesticides, herbicides, fungicides, color and aroma substances, vitamins, co-enzymes, tetra pyrroles, polyphenols, or fatty acid esters; and condensing the evaporated volatile components.

20. The process according to claim 1, wherein the raw product includes at least one of di-, tri- and polymers, di-, tri-, and polyesters, or other polymers or pre-polymers and the volatile component includes at least one of monomers, monoesters, or mono- or dimeric coupling components.

21. The process according to claim 19, wherein the raw product includes sunflower oil and the volatile component includes caprylic acid.

22. The distillation apparatus according to claim 12, wherein the washing liquid is different from the evaporated volatile component.

23. A distillation apparatus for purifying a substance mixture raw product by performing a process to separate a volatile component from a supplied substance mixture raw-product under conditions of flash or molecular distillation, in which the substance mixture raw product is heated, the volatile component is at least partially evaporated, the generated vapor is condensed, and in which the volatile component is condensed by contact with a washing liquid, the apparatus comprising:

an evaporator surface;

a condensation surface formed by a surface of the washing liquid, the washing liquid having a property of dissolving the volatile component such that a concentration of the volatile component in the raw product is reduced by the condensation of the evaporated volatile component on the condensation surface;

a raw product supply system which supplies a portion of the raw product to flow over the evaporation surface to evaporate the volatile component;

a washing liquid supply system which supplies the washing liquid which forms the condensing surface which condenses the volatile component; and a purified raw product outlet which discharges the portion of the raw product after the portion of the raw product has flowed over the evaporator surface and the volatile component has been evaporated.

* * * * *